United States Patent Office 3,131,151
Patented Apr. 28, 1964

3,131,151
SYNTHETIC LUBRICANTS
Paul M. Kerschner, Mercerville, N.J., and Albert I. Meyers, New Orleans, La., assignors to Cities Service Research and Development Company, New York, N.Y., a corporation of New Jersey
No Drawing. Filed Feb. 27, 1961, Ser. No. 91,579
4 Claims. (Cl. 252—49.8)

This invention relates to polyester synthetic lubricant having high viscosity indices and low pour point and is more particularly directed to mixtures of polyesters containing phosphorus.

In modern industry, there are many lubricant problems which cannot be solved through the use of mineral hydrocarbon lubricating oils. In some instances extreme conditions of temperature and pressure prohibit the use of ordinary mineral oils while in others a lubricant having a high viscosity index is required. Conventional hydrocarbon lubricating oils have been found to be lacking the necessary qualities for many lubricant applications. There is, therefore, a need for lubricant compositions which display desirable lubricant qualities over a wide range of operating conditions.

It is an object of this invention to provide lubricant compositions having desirable extreme pressure and temperature qualities. It is a further object of this invention to provide lubricant compositions which have high viscosity indices and low pour points. Other objects will become apparent hereinafter.

We have discovered that polyester mixtures prepared by reacting one mol of a diabasic acid with two mols of an organic diol and reacting that product with a mixture of a monoacid and an organic chlorinated phosphorus compound, produces a synthetic lubricant composition having the desirable qualities set out hereinbefore. The lubricant composition of this invention is a mixture of

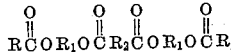

and

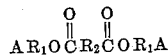

wherein R is an alkyl radical of from 1 to 18 carbon atoms, $R_1$ is an organic radical of from 2 to 10 carbon atoms, $R_2$ is a hydrocarbon radical of from 1 to 15 carbon atoms and A is either

or

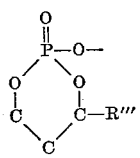

wherein R', R" and R''' are alkyl radicals from 1 to 18 carbon atoms.

We have found that the mixed polyester lubricants of this invention which have a phosphorous content of from 0.04 to 0.5 percent phosphorous in the total mixture display the desired qualities mentioned hereinbefore. A higher concentration of phosphorous does not appear to contribute any further improvement in extreme temperature and pressure qualities. A preferred range of phosphorous concentration is from 0.06 to 0.4 percent.

The mixed polyesters of this invention are prepared by reacting an organic diol with a dibasic organic acid in a molar ratio of 2:1. This reaction product is then reacted with a mixture of an organic monobasic acid or anhydride and an organic chlorophosphate.

An alternative means of preparing the polyesters of this invention consists of reacting an organic chlorophosphate with an excess amount of an organic diol. This reaction product is then reacted with a dibasic acid and finally the polyesters are terminated with a monobasic acid or anhydride.

Typical of the diols which may be used in the preparation of the polyesters of this invention are: ethylene glycol, diethylene glycol, tetraethylene glycol, propylene glycol, dipropylene, glycol, 1,4-butanediol, 1,3-butanediol, 2,3-butanediol, 1,5-pentanediol, 1,6-hexanediol, 1,10-decanediol, 2,2-diethyl-1,3-propanediol, 2-ethyl-1,3-hexanediol, 2,7-octanediol, 1,9-nonanediol.

Some of the dicarboxylic acids which may be used include: adipic, pimelic, suberic, azelaic, sebacic, "isosebacic"—a mixture of sebacic, 2-ethyl suberic and 2,4-diethyl adipic-, undecandioic, dodecanedioic, tridecanedioic, tetradecanedioic, pentadecanedioic, hexadecanedioic, heptadecanedioic, and octadecanedioic.

The following are examples of the monobasic acids or anhydrides which may be employed: acetic, propionic, butyric, isobutyric, valeric, hexanoic, heptanoic, octanoic, 2-ethylbutyric, 2-ethylhexoic, nonanoic, decanoic, undecanoic, dodecanoic, tridecanoic, tetradecanoic, pentadecanoic, hexadecanoic, heptadecanoic, octadecanoic, acetic anhydride, propionic anhydride, n-butyric anhydride, isobutyric anhydride and n-valeric anhydride.

The substituted chlorinated phosphorous compounds which may be used may be cyclic or aliphatic and include: dioctylchloro-, didecylchloro-, octyldecylchloro-, dihexylchloro-, diamylchloro-, amylhexylchloro-, di-2-ethylhexylchloro-, and di-2-ethylbutylchloro-phosphates, and 1-chloro-2,6-dioxa-1-phosphacyclohexanone
1-chloro-2,6-dioxa-4,4-dimethyl-1-phosphacyclohexanone
1-chloro-2,5-dioxa-3,4-dimethyl-1-phosphacyclopentanone
1-chloro-2,5-dioxa-1-phosphacyclopentanone
1-chloro-2,6-dioxa-4,4-diethyl-1-phosphacyclohexanone
1-chloro-2,6-dioxa-3,4-dimethyl-1-phosphacyclohexanone
1 - chloro-2,6-dioxa-4-butyl-4-ethyl-1-phosphacyclohexanone
1-chloro-2,6-dioxa-4-ethyl-5-propyl-1-phosphacyclohexanone The following examples illustrate the manner in which the polyesters of this invention are prepared.

EXAMPLE 1

Into a 1000 ml. three-neck, round-bottom flask provided with a mechanical stirrer, reflux condenser fitted with a water-trap, and a thermometer, 41.6 gm. (0.4 mol.) 1,5-pentanediol and 37.6 gm. (0.2 mol.) azelaic acid are added. To this mixture are added 1.0 gm. p-toluene sulfonic acid and 250 ml. toluene. The reactants are heated to reflux temperature and the water formed by the reaction is distilled off as the toluene-water azeotrope and collected in the water trap.

After water is no longer coming off, 36.4 gm. (0.36 mol.) of valeric acid is added and the reaction is continued until water again stops being formed. At this stage 13.6 gm. (0.04 mol.) of dioctylchlorophosphate is added and refluxing continued for an additional 4 hours.

The reaction is essentially complete as evidenced by a lack of any HCl being driven off.

At the end of this time the reactants are washed with water, 10% sodium carbonate solution and finally water again to remove unreacted acid and catalyst. The washed mixture is transferred to a distillation flask; solvent and unreacted alcohol are removed by distilling at reduced pressure. The polyester residue is recovered by further distillation using a molecular still operating at pressures of from 25 to 100 Hg. This product analyzed as follows:

| | |
|---|---|
| P, percent | 0.28 |
| Sap. No | 396 |
| Vis. @: 100° F., cs | 28.93 |
| 210° F., cs | 6.75 |
| V. I. | 168 |
| Pour point, ° F | 35 |

EXAMPLE 2

Following the procedure set forth in Example 1 the following molar quantities of materials were used.

41.6 gm. (0.4 mol.) 1,5-pentanediol
37.6 gm. (0.2 mol.) azelaic acid
38.8 gm. (0.38 mol.) valeric acid
6.8 gm. (0.02 mol.) dioctylchlorophosphate The resulting polyester had the following chemical and physical properties.

| | |
|---|---|
| P, percent | 0.08 |
| Sap. No. | 411 |
| Vis. @: 100° F., cs. | 32.86 |
| 210° F., cs. | 7.52 |
| V.I. | 164 |
| Pour point, ° F. | 40 |

EXAMPLE 3

Into a 1000 ml. three-neck round-bottom flask provided with a mechanical stirrer, reflux condenser fitted with a water trap, and a thermometer, 36.0 gm. (0.4 mol.) of 1,4 butanediol and 40.4 gm. (0.2 mol.) of sebacic acid are added. To this mixture 1.0 gm. of p-toluene sulfonic acid and 250 ml. of toluene are added. The reactants are heated to reflux temperature and the water formed by the reaction is distilled off as the toluene-water azeotrope and collected in the water trap.

When no further water is evolved, 62.0 gm. (0.36 mol.) of naphthoic acid is added and the mixture heated until no further water is evolved. At this point, 13.6 gm. (0.04 mol.) of dioctylchlorophosphate is added and the product is recovered as set out in Example 1.

EXAMPLE 4

Diethylene glycol, 81.6 gm. (0.77 mol.) is added to 4.8 gm. (0.027 mol.) 1-chloro-3 methyl-2,6-dioxa-1-phosphacyclohexanone in the apparatus described in Example 1. Toluene (250 ml.) and 1 gm. p-toluenesulfonic acid are added and the system is heated to the reflux temperature. The course of reaction is followed by the evolution of gaseous HCl. When gaseous HCl fumes are no longer detected this step of the reaction is considered complete. The product is then allowed to react with 72.4 gm. (0.385 mol.) of azelaic acid. This phase of the reaction is followed by measuring the amount of water of esterification formed. When water is no longer formed, 89.16 gm. (0.743 mol.) of acetic anhydride is added and the reaction is continued for an additional 3 to 4 hours. After this time the reaction product is washed free of unreacted catalyst and acid by successive washings with water, 10% sodium carbonate solution and finally water. The washed product is transferred to a distillation flask and unreacted alcohol and solvent are removed by distilling at a reduced pressure. The polyester residue is then treated with carbon-black and finally passed thru a column packed with a 50:50 mixture of activated alumina and Florosil. The recovered product had the following chemical and physical properties.

| | |
|---|---|
| P, percent | 0.063 |
| Sap. No. | 510 |
| Vis. @: 100° F., cs. | 38.28 |
| 210° F., cs. | 6.72 |
| V.I. | 136 |
| Flash point, ° F. | 535 |
| Fire point, ° F. | 620 |
| Pour point, ° F. | −50 |

EXAMPLE 5

To the apparatus described in Example 1, 41.6 gm. (0.4 mol.) of neopentyl glycol and 34.8 (0.2 mol.) of suberic acid are added and the mixture is heated to reflux temperature. When no further water is recovered in the water trap, 46.4 gm. (0.38 mol.) of benzoic acid is added and the mixture is heated to reflux temperature. When the evolution of water ceases, 5.4 gm. (0.02 mol.) of diphenylchlorophosphate is added. The reaction is followed by the evolution of HCl. The product is recovered as described in Example 1.

EXAMPLE 6

Following the procedure set forth in Example 4 the following molar quantities of materials are used:

81.6 gm. (0.77 mol.) diethylene glycol
72.4 gm. (0.385 mol.) azelaic acid
9.6 gm. (0.056 mol.) 1-chloro-3-methyl-2,6-dioxa-1-phosphacyclohexanone
85.68 gm. (0.714 mol.) acetic anhydride The resulting polyester has the following characteristics.

| | |
|---|---|
| P, percent | 0.12 |
| Sap. No. | 500 |
| Vis. @: 100° F., cs. | 42.00 |
| 210° F., cs. | 7.13 |
| V.I. | 134 |
| Flash point, ° F. | 525 |
| Fire point, ° F. | 590 |
| Pour point, ° F. | −50 |

EXAMPLE 7

According to the procedures set out hereinbefore, 94.5 gm. (0.8 mol.) of 1,6-hexanediol is reacted with 64.0 gm. (0.4 mol.) of pimelic acid. That reaction product is then reacted with 98.0 gm. (0.72 mol.) of O-toluic acid and 24.3 gm. (0.08 mol.) of octylphenylchlorophosphate.

EXAMPLE 8

Following the procedure set out in Example 1, 36.0 gm. (0.4 mol.) of 1,3-butanediol is reacted with 29.2 gm. (0.2 mol.) of adipic acid. When water has ceased to be recovered in the water trap, 57.0 gm. (0.38 mol.) of p-tolylacetic acid is added to the reaction flask. When the evolution of water has again ceased, 13.6 gm. (0.02 mol.) of di-2-ethylhexylchlorophosphate is added the final product is recovered as described hereinbefore.

EXAMPLE 9

Following the procedure of Example 1, 81.6 gm. (0.77 mol.) of diethylene glycol is reacted with 72.4 gm. (0.385 mol.) of azelaic acid. The product is reacted with 113.0 gm. (0.743 mol.) of anisic acid and 7.2 gm. (0.027 mol.) of diphenylchlorophosphate. The resulting polyester is recovered as previously described.

EXAMPLE 10

Following the procedure of Example 1, 53.6 gm. (0.4 mol.) of propylene glycol is reacted with 34.8 gm. (0.2 mol.) of suberic acid. That product is reacted with 43.9 gm. (0.36 mol.) of benzoic acid and 11.8 gm. (0.04 mol.)

of dicresylchlorophosphate and the product recovered as previously described.

In order to determine the effectiveness of these compositions as lubricants, several samples were subjected to the Shell 4-ball test. The apparatus used in this test includes three rigidly held ½″ metal balls (type 52–100 steel balls) submerged in a lubricant to be tested in a metal cup. A rotating ball of the same size is then imposed on the fixed balls and allowed to rub for a fixed period of time. The fourth ball is held in contact with the fixed balls by an arm to which various lead weights may be attached. As the fourth ball continues to rotate, circular scars begin to appear at the points of contact. The average diameter of these scars expressed in millimeters for a fixed period of time, under a constant load and at a specified speed is a measure of wear. Table I shows the results obtained when the products of Examples 1, 2, 4 and 6 identified as samples 1, 2, 3 and 4 respectively were subjected to this test. Blank 1 is a commercially available mineral oil having an SUS of 100. Blank 2 is a commercially available aliphatic polyester lubricant containing no phosphorus. The test was run at 70° C. and the fourth ball was rotated at 600 and 1800 r.p.m. respectively.

Table I

| | Blank 1 | Blank 2 | Sample 1 | Sample 2 | Sample 3 | Sample 4 |
|---|---|---|---|---|---|---|
| Percent P | 0 | 0 | 0.28 | 0.08 | 0.063 | 0.12 |
| Load (in kgs.): @ 600 r.p.m.— | | | | | | |
| 1 | | 0.32 | 0.32 | 0.30 | 0.30 | 0.45 |
| 10 | | 0.61 | 00.60 | 0.40 | 0.68 | 0.60 |
| 20 | | 0.71 | 0.84 | 0.60 | 0.70 | 0.70 |
| @ 1,800 r.p.m.— | | | | | | |
| 40 | 0.36 | | | | | |
| 50 | | 0.40 | | | | |
| 60 | 1.9 | 2.10 | | | | |
| 70 | | | | | | |
| 80 | | | | | | |
| 90 | | | | | 0.40 | |
| 100 | | | | 0.50 | 2.29 | 0.40 |
| 110 | | | | 0.50 | 0.80 | 0.80 |
| 120 | | | 1.20 | | | |
| Seizure Load | 50 | 60 | 115 | 105 | 95 | 105 |

An examination of Table I will reveal that the polyesters of this invention show a great improvement in lubricant properties over conventional mineral oil lubricants. Sample 1 had a seizure load of 115 kg. while the blank had a seizure load of 60 kg. This is almost a two-fold improvement. Samples 2 and 4 proved to have a seizure load of 105 while Sample 3 had a seizure load of 95. The blank showed a wear scar of 0.40 at 50 kgs. while the sample did not show the same degree of wear until over 90 kgs. had been added to the loading arm. This too is a significant improvement.

The examples and tables included in this specification are offered as being merely illustrative of this invention and it is to be understood that the scope of this invention is to be limited solely by the claims thereto found hereinafter.

We claim:

1. A synthetic lubricant composition consisting essentially of a mixture of

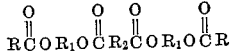

and

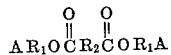

wherein R is an alkyl radical of from 1 to 18 carbon atoms, $R_1$ is an alkylene radical of from 2 to 10 carbon atoms, $R_2$ is a divalent aliphatic hydrocarbon radical of from 1 to 15 carbon atoms and A is selected from the group consisting of

and

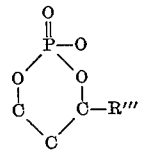

wherein R′, R″ and R‴ are alkyl radicals of from 1 to 18 carbon atoms, provided that the phosphorus concentration in the total mixture is maintained within the range of 0.04 to 0.5% by weight.

2. The synthetic lubricant composition of claim 1 wherein the phosphorus concentration is from 0.6 to 0.4% by weight.

3. The composition of claim 1 wherein A of the generic formula is:

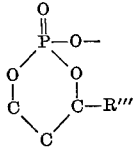

4. The composition of claim 2 wherein A of the generic formula is:

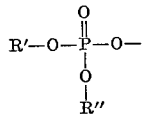

References Cited in the file of this patent

UNITED STATES PATENTS

| | | |
|---|---|---|
| 2,575,196 | Smith | Nov. 13, 1951 |
| 2,632,767 | Smith et al. | Mar. 24, 1953 |
| 2,837,562 | Matuszak et al. | June 3, 1958 |
| 2,980,722 | Birum et al. | Apr. 18, 1961 |
| 2,997,442 | Peale et al. | Aug. 22, 1961 |

UNITED STATES PATENT OFFICE

CERTIFICATE OF CORRECTION

Patent No. 3,131,151  April 28, 1964

Paul M. Kerschner et al.

It is hereby certified that error appears in the above numbered patent requiring correction and that the said Letters Patent should read as corrected below.

Column 6, line 33, for "0.6" read -- 0.06 --.

Signed and sealed this 11th day of August 1964.

(SEAL)
Attest:

ERNEST W. SWIDER
Attesting Officer

EDWARD J. BRENNER
Commissioner of Patents